May 29, 1934.   S. M. BÄCKSTRÖM ET AL   1,960,802
REFRIGERATION
Filed March 28, 1929
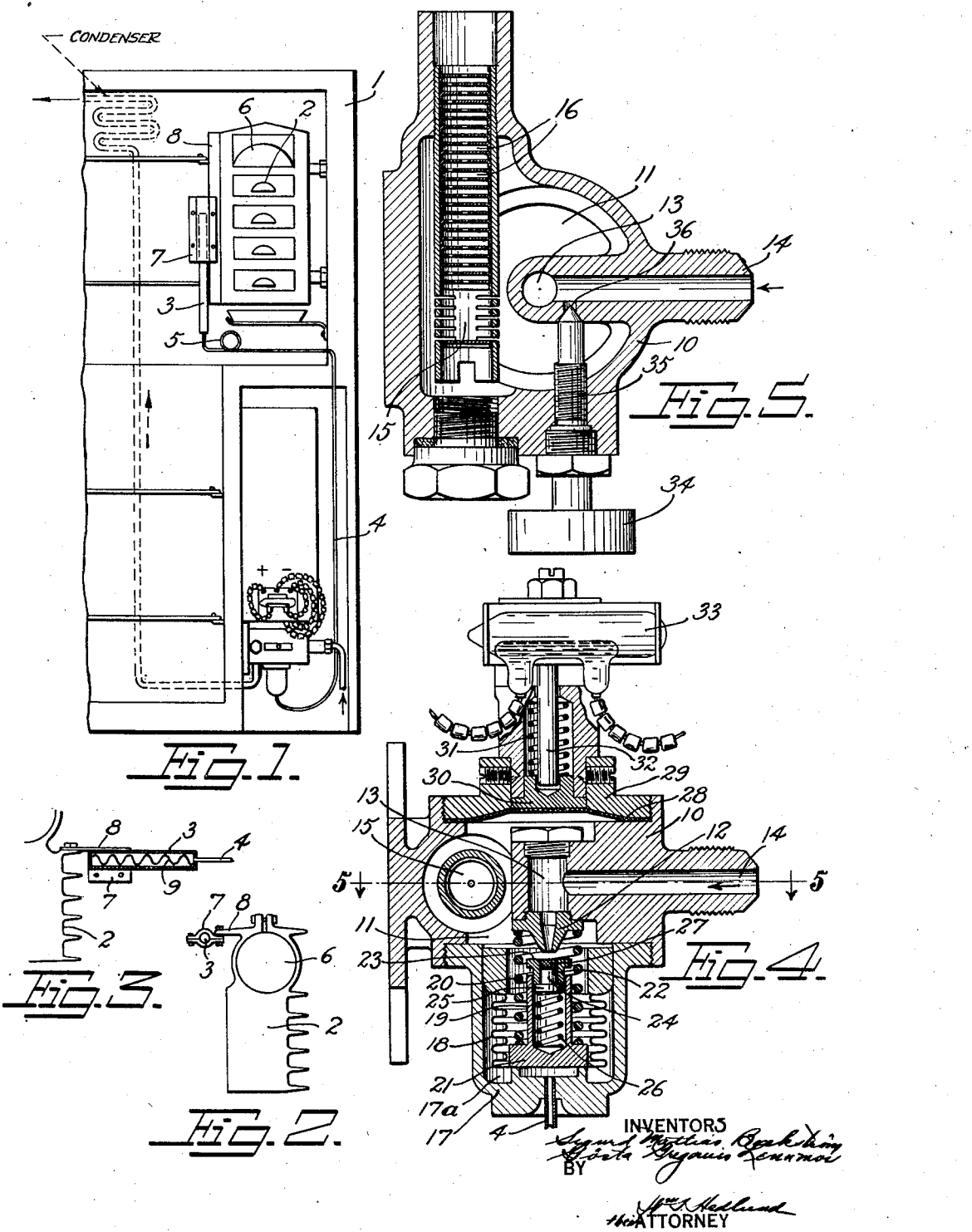

Patented May 29, 1934

1,960,802

UNITED STATES PATENT OFFICE 1,960,802

REFRIGERATION

Sigurd Mattias Bäckström and Gösta Gregorius Lennmor, Stockholm, Sweden, assignors, by mesne assignments, to Electrolux Servel Corporation, New York, N. Y., a corporation of Delaware Application March 28, 1929, Serial No. 350,475
In Germany March 30, 1928

16 Claims. (Cl. 62—4)

The present invention relates to temperature regulation devices for refrigerators or the like in which the impulses required for actuation of a thermostat are derived from changes of volume occurring in a liquid on passing between liquid and solid states, as, for instance, change of water to ice and vice versa. Various fluids may be used. One or more substances may be added to the fluid undergoing change of state to lower or raise its freezing point as, for instance, salts, glycerine, alcohol or the like.

In carrying out the invention a sensitive member containing such fluid is placed in the refrigerator cabinet and so arranged in relation to an evaporator placed in the cabinet or to a cooling body in heat conducting contact with the evaporator that only a portion of the sensitive member is in direct heat conducting contact with the evaporator or cooling body while another portion of the member is directly influenced by the temperature of the air in the refrigerator cabinet so that, due to different temperatures in these portions, the fluid may be in the solid state, such as ice, in the first mentioned portion, while in liquid state, such as water, in the last mentioned portion. The thermostat will thus be acted upon both by the temperature of the evaporator or the cooling body and by the temperature of the air in the refrigerator cabinet, which temperatures usually differ to a considerable degree. If the evaporator or the cooling body is provided with means, such as trays, for production of ice, the temperature in the same should be kept as low as to permit such ice production, for instance 1½° F., whereas the temperature in the food space of the cabinet may be 40° F. and higher. By arranging the sensitive member in accordance with the invention, both these temperatures can be regulated in that an alteration in any of these temperatures, which both influence the sensitive member, will cause a corresponding change in the amount of ice within the sensitive member. At the same time a reliable and uniform operation of the thermostat is obtained, as even relatively small alterations in any of the temperatures affecting the sensitive member will result in great forces actuating the thermostat.

The change of volume of the fluid contained in the sensitive member caused by change of temperature is utilized to control, directly or indirectly, the supply of energy to the refrigerating apparatus, as, for example, the supply of heat to an absorption refrigerating apparatus or the supply of electricity to an electric refrigerator. If the thermostatic regulator is so constructed as to control directly the supply of cooling liquid to one or more heat rejecting parts of the refrigerating apparatus, whereas the energy supply means of the apparatus is actuated indirectly by means of the supply of cooling liquid, the thermostatic regulator is preferably provided with a by-pass or shunt conduit for the cooling liquid, which conduit may be controlled by means of a manually operable valve. When this valve is opened, the thermostat will, consequently, be cut out of operation, so that the refrigerating apparatus will operate without being actuated by the thermostat, which sometimes is desirable, for instance, when a very rapid ice production is desired.

The invention will be more fully described with reference to the accompanying drawing showing by way of example a preferred embodiment of same. Fig. 1 is a front view of a refrigerator cabinet with a thermostatic regulator mounted therein according to the invention. Figs. 2 and 3 illustrate in detail two different manners of arranging the sensitive member on the evaporator, Fig. 2 being a top view of the sensitive member and adjacent parts of the evaporator shown in Fig. 1. Figs. 4 and 5 are sectional views of the valve mechanism of the regulator on an enlarged scale, Fig. 5 being a section taken on the line 5—5 in Fig. 4.

Referring to Fig. 1, reference character 1 designates a refrigerator cabinet and 2 a cooling body placed within said cabinet and surrounding an evaporator shell 6 of a refrigerating apparatus and provided with means, such as trays, for the production of ice. The cooling body and evaporator shell will jointly be designated by the term evaporator. It will be understood that the invention is applicable to all kinds of refrigerating apparatus. The sensitive member of the thermostatic regulator device consists of a vertically mounted bulb 3, the upper portion of which is in direct and good heat conducting contact with the cooling body 2, whereas its lower portion is surrounded on all sides or substantially surrounded by the air in the cabinet without being or substantially without being in direct heat conducting contact with the evaporator.

The liquid in the inner portion of the bulb 3 arranged in direct heat conducting contact with the evaporator is frozen due to the directly acting effect of the permanently low temperature of the evaporator, whereas the liquid in the lower portion of the bulb has a temperature suitable for preserving food contained in the refrigerating cabinet, for instance 40° F., and consequently, does not usually freeze. From this it is clear that a falling temperature, either of the air in the cabinet or of the evaporator, below the limit to be maintained will cause an increased freezing of liquid in the upper portion of the thermostat bulb and thereby a change of volume,—in case of water an increase of volume—, which in a manner to be described later on will set the thermostatic regulator into operation and cut off, wholly or partly, the supply of the energy to the refrigerating apparatus, whereas raising temperatures will have an opposite effect. If the bulb is arranged vertically and water is used, a continued freezing due to falling temperature will proceed without disturbance from the upper portion of the bulb downwardly, as in this case the density of the water increases downwards. If, on the contrary, the bulb 3 is arranged horizontally or in a more or less inclined position, disturbances can easily occur when using water, as circulation within the bulb can occur on account of water not having its highest density at its freezing point, namely at 32° F., but at about 40° F. The heavier water of 40° F. thus could change place with the water adjacent the ice which has a temperature below 40° F., whereby the temperature of that portion of the water in the bulb which is not frozen could sink, without any new ice being formed and, consequently, without the thermostat being shifted in spite of the temperature in the cabinet having fallen below the value for which the thermostat is set to function.

The bulb 3 is connected by means of a conduit 4 with a chamber arranged in a valve housing of the regulator. Said chamber will be more fully described in connection with Figs. 4 and 5. Preferably, the conduit 4 is made elastic to some extent, for instance, by the provision of a loop 5 or the like.

Fig. 2 is a top view showing how the bulb 3 is connected with the evaporator 2 which is in direct heat conducting contact with the evaporator shell 6 of the refrigerating apparatus. As seen, the bulb 3 is secured to a flange 8 on the evaporator 2 by means of metal clamping jaws 7. By this detachable connection of the bulb 3 with the cooling body 2, the former may be moved in relation to the latter, so that a greater or less portion of the bulb is brought into direct heat conducting contact with the evaporator 2, whereby the working range of temperature values of the thermostat can be varied, as a greater or less portion of the bulb can be subjected to direct effect of the temperature of the evaporator and of the temperature of the air in the refrigerator cabinet respectively.

According to Fig. 3 the bulb 3 is arranged horizontally, but is secured to the cooling body 2 of the evaporator in similar manner to that described with reference to Fig. 2. In this case it is suitable to use means within the bulb, for instance a perforated corrugated band 9 or the like, for preventing the above mentioned detrimental circulation of the water.

The preferred embodiment of the valve housing is shown in Figs. 4 and 5. The housing casing 10 contains a chamber 11 communicating, through a valve chamber 13 provided with a nozzle 12, with a supply pipe 14 for cooling water. From this chamber 13 the water flows through a pressure reducing device which may be of various forms to the cooling jackets of the heat radiating parts of the refrigerating apparatus, such as absorber and condenser coils, as shown more or less diagrammatically in Fig. 1. In the embodiment shown the pressure reducing device consists of a pipe 15 (see Fig. 5) in which plates or discs 16 provided with narrow passage openings are disposed in such manner that a tortuous path of flow for the water is effected. On account of the repeated changes of speed occurring when the water is flowing through this device, the water pressure and thereby the rate of flow of water are reduced to a desired value which may be varied by suitably varying the number of discs 16.

Screwed into or in any other manner tightly secured to the casing 10 is a member 17 in part enclosing chamber 17a to which is connected the conduit 4 coming from the bulb. Part of the bounding wall of this chamber is formed resiliently; in the embodiment shown this part consists of flexible bellows 18. The chamber 17a is filled with a liquid, for instance water, preferably the same liquid as used in the bulb 3. Positioned within the bellows 18 is a hollow member 19 surrounded by a spring 20 acting at its lower end against an offset portion 21 of the member 19 and at its upper end against nozzle member 12. Movably inserted in the upper portion of the hollow member 19 is a cap 22 having an upper flange 23 adapted to contact the upper edge of the member 19. Journalled in said cap 22 is a small cylindrical member 24 which is provided at its lower end with a flange 25 and which, by means of a spring 26 disposed within the member 19, is kept in position within the cap 22 with the flange 25 abutting against the lower edge of said cap 22. The member 24 is adapted to co-operate with the nozzle 12 and close the mouth thereof, when the member 19 is moved upwardly against the action of the spring 20 on account of expansion in the bulb 3 with accompanying increase of pressure in the liquid in chamber 17a acting on the bellows 18. Washer 27 of rubber or any other suitable packing material placed above the member 24 closes the outlet opening of the nozzle 12.

At its top the chamber 11 is closed by a diaphragm 28, the edges of which are kept pressed against the thermostat casing 10 by a plate 29 screwed into or in other manner secured to said casing and provided with a recess on its surface adjacent said diaphragm. A piston 30 slidingly mounted in said plate 29 is acted on by a spring 31 to force the diaphragm 28 downwardly against the action of the water pressure on the same. Arranged within said spring 31 is a rod 32 co-operating with a tiltable mercury switch 33, by means of which the supply of electric current to the energy supply means of the refrigerating apparatus, for instance an electric heating element, can be closed and broken, respectively. In the embodiment shown the mercury switch 33 is so constructed that the circuit is closed when the switch 33 is held lifted in horizontal position by means of the rod 32, that is to say, when the nozzle 12 is open so that full water pressure prevails in the chamber 11, but broken when this pressure, on account of the nozzle 12 being closed, decreases and the switch due to its own weight tilts downwardly and assumes an inclined position.

In the drawing the regulator is shown in the position which it assumes, when the energy supply means of the refrigerating apparatus is switched in and, thus, the temperature in the refrigerator cabinet has not yet attained the limit for which the thermostat is set to shut off or diminish the supply of energy. If the temperature in the cabinet or the temperature of the evaporator 2 respectively falls below the value for which the thermostat is set to function, the quantity of ice in the bulb 3 increases, whereby the water contained therein, in conduit 4 and in the pressure chamber 18 is exposed to an increased pressure due to the increase of volume, causing the member 19 to move upwardly against the action of the spring 20. Thereby the nozzle 12 is closed by the shut-off member 24 and the washer 27. Any continued movement of the member 19 will be taken up by the spring 26. It is of great importance that the excess of the movement of the bellows 18 and the member 19 caused by the impulse can be compensated in this manner, that is to say, that the arrangement as a whole is resilient after the nozzle 12 has closed, as otherwise there is a risk of the bulb 3 or the pressure chamber 18 breaking. By closing the nozzle 12 the supply of water to the chamber 11 and the cooling jackets of the refrigerating apparatus is shut off, whereby the pressure acting against the diaphragm 28 drops, said diaphragm being then forced back by the spring 31 and the switch 33, which before has been kept lifted in circuit-closing position by the piston 30 and the rod 32, being then permitted to tilt downwardly, cutting out the supply of energy to the refrigerating apparatus. When the temperature in the cabinet or of the evaporator respectively has exceeded the limits for which the thermostat is set to again switch in the energy supply means of the refrigerating apparatus, part of the ice in the bulb 3 will melt whereby the volume of the mixture of ice and water in the closed system containing said mixture will decrease, so that the bellows 18 and the member 19 together with the shut-off member 24, 27 will be forced away from the nozzle 12 by the action of the spring 20, uncovering the mouth of said nozzle so that the cooling water is again supplied to chamber 11. The diaphragm 28 is again exposed to the pressure of the cooling water and forced upwardly so that the switch 33, by means of the piston 30 and the rod 32, is moved to horizontal, that is circuit-closing position, causing the supply of energy to the refrigerating apparatus to be resumed.

In the embodiment shown the thermostat is provided with manually operable means whereby it can be cut out. This means (see Fig. 5) comprises a valve 35 provided with a manually operable member 34 and arranged to close or open a channel 36 in the supply pipe 14 for the cooling water, said channel 36 forming a direct connection between said pipe 14 and the chamber 11. When the valve 35 is opened, the cooling jackets of the refrigerating apparatus are, consequently, in open communication with the supply pipe 14, the thermostat being thus cut out.

While we have illustrated and described one embodiment of our invention, this has been done by way of example only, and it is to be understood that all other forms and embodiments fall within its scope. For example, our invention contemplates the control of other than electric energy, and its scope is to be determined and limited only by the appended claims viewed in the light of the prior art.

What we claim is:

1. Refrigerating apparatus comprising an evaporator, energy control means for the apparatus, means to actuate the energy control means including a chamber having a flexible wall portion, a bulb and a conduit connecting said chamber with said bulb, said bulb, conduit and chamber containing a fluid of such nature as to freeze and melt within the working range of temperature, and said bulb being positioned with a portion thereof in direct heat transfer relationship with the evaporator and a portion in heat transfer relation with surrounding air.

2. The combination with an automatic refrigerator including an evaporator and energy supply means, of a thermostatic regulator comprising a bulb and of the type wherein freezing and melting of a fluid serves to provide regulating force, having the bulb placed with a portion thereof in direct heat transfer relation with the evaporator and a portion in heat transfer relation with surrounding air.

3. The combination with an automatic refrigerator including an evaporator and energy supply means, of a thermostatic regulator comprising a bulb, valve mechanism and a tube connecting the bulb with the valve mechanism and of the type wherein freezing and melting of a fluid serves to provide regulating force, having the bulb placed vertically with a portion thereof in direct heat transfer relation with the evaporator and a portion in heat transfer relation with surrounding air and the said tube connected to the bulb at the lower end thereof.

4. In a refrigerator, a refrigerating apparatus comprising an evaporator and means for maintaining a low temperature in said evaporator, and a thermostatic control device for said apparatus comprising a thermostatic bulb containing water adapted to be frozen, the upper portion only of said bulb being in heat conducting relation with said evaporator.

5. In a refrigerator, a cabinet having a food storage compartment, a refrigerating apparatus comprising an evaporator, said evaporator disposed in said compartment and means for maintaining a low temperature in said evaporator, and a thermostatic control device for said apparatus comprising a thermostatic bulb containing a liquid adapted to be frozen, a portion of said bulb being in heat conducting relation with said evaporator and a portion in heat exchange relation with the air in said compartment.

6. In a refrigerator, a cabinet having a food storage compartment, a refrigerating apparatus comprising an evaporator, said evaporator disposed in said compartment and means for maintaining a low temperature in said evaporator, and a thermostatic control device for said apparatus comprising a thermostatic bulb containing a liquid adapted to be frozen, a portion of said bulb being in heat conducting relation with said evaporator and a portion in heat exchange relation with the air in said compartment and means to vary the proportion of said bulb which is in heat transfer relation with said evaporator and in heat exchange relation with said air respectively.

7. In a refrigerator, a refrigerating apparatus comprising an evaporator and means for maintaining a low tempearture in said evaporator, and a thermostatic control device for said apparatus comprising a vertically disposed thermostatic bulb containing a liquid, the upper portion of said bulb being in heat conducting relation with said evaporator so that the liquid in the upper part of said bulb will be frozen.

8. In a refrigerator, a cabinet having a food storage compartment, a refrigerating apparatus comprising an evaporator, said evaporator disposed in said compartment and means for maintaining a low temperature in said evaporator, and a thermostatic control device comprising a vertically disposed thermostatic bulb containing a liquid, the upper portion of said bulb being in heat conducting relation with said evaporator and the lower portion in heat exchange relation with the air in said compartment so that the liquid in the upper part of the bulb will be frozen while that in the lower part will remain in liquid form.

9. In a refrigerator, a cabinet having a food storage compartment, a refrigerating apparatus comprising an evaporator, said evaporator disposed in said compartment and means for maintaining a low temperature in said evaporator, and a thermostatic control device comprising a vertically disposed thermostatic bulb containing a liquid, the upper portion of said bulb being in heat conducting relation with said evaporator and the lower portion in heat exchange relation with the air in said compartment and means to vary the proportion of said bulb which is in heat transfer relation with said evaporator and in heat exchange relation with said air respectively, so as to vary the amount of liquid in said bulb which is frozen.

10. In a refrigerator, a refrigerating apparatus comprising an evaporator and means for maintaining a low temperature in said evaporator, means to supply energy for operating said apparatus, means to supply cooling water for cooling heat-giving members of said apparatus, a thermostatic control device comprising a bulb in heat exchange with said evaporator, a pressure chamber, a conduit connecting said bulb with said pressure chamber, said bulb, conduit and chamber containing an expandable fluid, a resilient member in said chamber arranged to be distorted by an increase in volume of said fluid to control the supply of cooling water, a second resilient member adapted to yield upon further increase in volume of said fluid and a third resilient member actuated by the pressure of the cooling water for controlling the energy supplied to said apparatus.

11. The combination with a refrigerator including an evaporator and an energy supply means, of a thermostatic regulator of the type wherein freezing and melting a fluid serves to provide regulating force comprising a bulb, valve mechanism, a tube connecting the bulb with the valve mechanism, said bulb being placed horizontally with a portion thereof in direct heat transfer relation with the evaporator and a portion in heat transfer relation with surrounding air, and means in said bulb for restraining circulation of fluid therein.

12. The combination with a refrigerator including an evaporator and an energy supply means, of a thermostatic regulator of the type wherein freezing and melting of a fluid serves to provide regulating force comprising a bulb, valve mechanism, a tube connecting the bulb with the valve mechanism, said bulb being placed with a portion thereof in direct heat transfer relation with the evaporator and a portion in heat transfer relation with surrounding air, and means for varying the amount of said bulb which is in direct heat transfer relation with the evaporator.

13. The combination with a refrigerator including an evaporator and an energy supply means, of a thermostatic regulator of the type wherein freezing and melting of a fluid serves to provide regulating force comprising a bulb, valve mechanism, a tube connecting the bulb with the valve mechanism, said bulb being placed horizontally and having a portion only thereof in direct heat conducting relation with said evaporator, and means in said bulb for restraining circulation of fluid therein.

14. The combination with a refrigerator including an evaporator and an energy supply means, of a thermostatic regulator of the type wherein freezing and melting of a fluid serves to provide regulating force comprising a bulb, valve mechanism, a tube connecting the bulb with the valve mechanism, said bulb being placed horizontally with a portion thereof in direct heat transfer relation with the evaporator and a portion in heat transfer relation with surrounding air, and means for varying the amount of said bulb which is in direct heat transfer relation with the evaporator.

15. The combination with an automatic refrigerator including an evaporator and a heat radiating part, of a thermostatic regulator comprising a housing formed with a passageway for flow of cooling fluid therethrough, a conduit for conducting said fluid into heat exchange relation with said heat radiating part, valve mechanism for controlling flow through said passageway, means for controlling the valve mechanism comprising a bulb in heat exchange relation with said evaporator and containing a mobile expansible substance, and a manually operable by-pass around said valve mechanism for permitting flow of cooling fluid past the valve mechanism.

16. The combination with an automatic refrigerator including an evaporator and a heat radiating part, of a thermostatic control device comprising a bulb in heat exchange relation with said evaporator, a pressure chamber, a conduit connecting said bulb to said pressure chamber, said bulb, conduit and pressure chamber containing an expansible fluid, a resilient member in said chamber arranged to be distorted by an increase in volume of said fluid to operate said control device, and a second resilient member adapted to yield upon further increase in volume of said fluid.

SIGURD MATTIAS BÄCKSTRÖM.
GÖSTA GREGORIUS LENNMOR.